United States Patent
Arbuckle et al.

(10) Patent No.: US 9,156,536 B1
(45) Date of Patent: *Oct. 13, 2015

(54) MARINE PROPULSION SYSTEM WITH EFFICIENT ENGINE SPEED DELTA

(71) Applicant: Brunswick Corporation, Lake Forest, IL (US)

(72) Inventors: Jason S. Arbuckle, Horicon, WI (US); Matthew W. Snyder, Fond du Lac, WI (US); Thomas S. Kirchhoff, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/284,795

(22) Filed: May 22, 2014

Related U.S. Application Data

(63) Continuation of application No. 13/588,473, filed on Aug. 17, 2012, now Pat. No. 8,762,022.

(51) Int. Cl.
*B63H 21/20* (2006.01)
*B63H 21/21* (2006.01)

(52) U.S. Cl.
CPC .......... *B63H 21/21* (2013.01); *B63H 2021/216* (2013.01)

(58) Field of Classification Search
CPC ........ B63C 11/42; B63H 21/20; B63H 21/21; B63H 21/28; B63J 2099/006; F02B 61/045; F02D 9/02; F02D 11/02; F02D 11/105; F02D 11/106; F02D 2011/102; F02D 2041/1409; F02D 2041/141; F02D 2200/602; Y02T 70/742

USPC ......... 701/21, 42, 85; 114/102.1, 102.13, 275
See application file for complete search history.

(56) References Cited

U.S. PATENT DOCUMENTS

| | | | |
|---|---|---|---|
| 1,332,631 | A | 3/1920 | Morse |
| 3,230,698 | A | 1/1966 | Nettles |

(Continued)

FOREIGN PATENT DOCUMENTS

| | | |
|---|---|---|
| DE | 101 53 586 A1 | 5/2002 |
| DE | 103 18 293 A1 | 11/2004 |

OTHER PUBLICATIONS

Web Page for PowerCharge Battery Charger HV Series—Overview; http://www.powerdesignersusa.com/powercharge_hv.htm, last visited Jan. 27, 2011 (one page).

(Continued)

*Primary Examiner* — Mary Cheung
*Assistant Examiner* — Atul Trivedi
(74) *Attorney, Agent, or Firm* — Andrus Intellectual Property Law, LLP

(57) ABSTRACT

A system and method is provided for efficiently changing controlled engine speed of a marine internal combustion engine in a marine propulsion system for propelling a marine vessel. The system responds to the operator changing the operator-selected engine speed, from a first-selected engine speed to a second-selected engine speed, by predicting throttle position needed to provide the second-selected engine speed, and providing a feed forward signal moving the throttle to the predicted throttle position, without waiting for a slower responding PID controller and/or overshoot thereof, and concomitant instability or oscillation, and then uses the engine speed control system including any PID controller to maintain engine speed at the second-selected engine speed.

18 Claims, 1 Drawing Sheet

(56) References Cited

U.S. PATENT DOCUMENTS

| | | | |
|---|---|---|---|
| 3,503,464 A | 3/1970 | Yardney | |
| 3,566,717 A | 3/1971 | Berman et al. | |
| 3,650,345 A | 3/1972 | Yardney | |
| 3,703,642 A | 11/1972 | Balaguer | |
| 3,888,325 A | 6/1975 | Reinbeck | |
| 4,233,858 A | 11/1980 | Rowlett | |
| 4,338,525 A | 7/1982 | Kilgore | |
| 4,763,626 A * | 8/1988 | Staerzl | 123/438 |
| 5,080,064 A | 1/1992 | Buslepp et al. | |
| 5,081,365 A | 1/1992 | Field et al. | |
| 5,301,764 A | 4/1994 | Gardner | |
| 5,616,056 A | 4/1997 | Meissner | |
| 5,835,876 A | 11/1998 | Hathaway et al. | |
| 5,848,582 A | 12/1998 | Ehlers et al. | |
| 5,880,575 A | 3/1999 | Itou et al. | |
| 5,969,624 A | 10/1999 | Sakai et al. | |
| 6,009,371 A | 12/1999 | Kobayashi | |
| 6,133,707 A | 10/2000 | Kikuchi et al. | |
| 6,298,824 B1 * | 10/2001 | Suhre | 123/406.49 |
| 6,360,724 B1 * | 3/2002 | Suhre et al. | 123/481 |
| 6,396,161 B1 | 5/2002 | Crecelius et al. | |
| 6,425,370 B1 | 7/2002 | Kramer | |
| 6,443,286 B1 | 9/2002 | Bratel et al. | |
| 6,554,088 B2 | 4/2003 | Severinsky et al. | |
| 6,587,765 B1 | 7/2003 | Graham et al. | |
| 6,701,890 B1 * | 3/2004 | Suhre et al. | 123/350 |
| 6,757,606 B1 | 6/2004 | Gonring | |
| 6,758,198 B1 | 7/2004 | Suhre et al. | |
| 6,800,004 B1 | 10/2004 | White et al. | |
| 6,821,171 B1 | 11/2004 | Wynveen et al. | |
| 6,857,918 B1 | 2/2005 | Lebreux et al. | |
| 6,882,129 B2 | 4/2005 | Boskovitch et al. | |
| 6,915,781 B2 | 7/2005 | Rayl | |
| 6,919,711 B2 | 7/2005 | Haydock et al. | |
| 6,978,617 B2 | 12/2005 | Goldmeer et al. | |
| 7,296,648 B2 | 11/2007 | Tatara et al. | |
| 7,318,396 B1 | 1/2008 | Belter et al. | |
| 7,473,149 B2 | 1/2009 | Mizokawa | |
| 7,518,344 B2 | 4/2009 | Sihler | |
| 7,530,864 B2 | 5/2009 | Kaji | |
| 7,556,547 B2 | 7/2009 | Kaji | |
| 7,565,939 B2 | 7/2009 | Ando et al. | |
| 7,621,789 B2 | 11/2009 | Mizokawa | |
| 8,039,976 B2 | 10/2011 | Sato et al. | |
| 8,062,081 B2 | 11/2011 | Barrett et al. | |
| 8,527,183 B2 | 9/2013 | Gallagher et al. | |
| 8,762,022 B1 * | 6/2014 | Arbuckle et al. | 701/85 |
| 2002/0086593 A1 * | 7/2002 | Shidara et al. | 440/1 |
| 2003/0000500 A1 * | 1/2003 | Chatfield | 123/438 |
| 2003/0017468 A1 | 2/2003 | Into | |
| 2003/0027468 A1 | 2/2003 | Into | |
| 2003/0054704 A1 | 3/2003 | Kanno | |
| 2004/0163861 A1 | 8/2004 | Fukuda et al. | |
| 2005/0000480 A1 | 1/2005 | Yasui et al. | |
| 2005/0106953 A1 | 5/2005 | Andersen et al. | |
| 2006/0025025 A1 | 2/2006 | Kitani et al. | |
| 2006/0040791 A1 | 2/2006 | Nakajima et al. | |
| 2006/0047406 A1 * | 3/2006 | Chatfield et al. | 701/104 |
| 2006/0096555 A1 | 5/2006 | Buck | |
| 2006/0166573 A1 | 7/2006 | Vetta et al. | |
| 2007/0208486 A1 * | 9/2007 | Yasui et al. | 701/101 |
| 2007/0225892 A1 * | 9/2007 | Yasui et al. | 701/104 |
| 2008/0051979 A1 | 2/2008 | Yasui et al. | |
| 2008/0120516 A1 | 5/2008 | Thor | |
| 2009/0156068 A1 | 6/2009 | Barrett et al. | |
| 2009/0284228 A1 | 11/2009 | Kumar | |
| 2009/0288896 A1 | 11/2009 | Ichikawa | |
| 2010/0006065 A1 | 1/2010 | Tripathi et al. | 123/350 |
| 2010/0043753 A1 * | 2/2010 | Gallagher et al. | 123/447 |
| 2010/0105259 A1 | 4/2010 | Wejrzanowski et al. | |
| 2010/0123436 A1 | 5/2010 | Herrod et al. | |
| 2010/0125383 A1 | 5/2010 | Caouette | |
| 2010/0144219 A1 | 6/2010 | Balogh et al. | |
| 2010/0191397 A1 | 7/2010 | Nose et al. | |
| 2010/0250041 A1 | 9/2010 | Li | |
| 2011/0195618 A1 | 8/2011 | Arbuckle et al. | |
| 2011/0202258 A1 * | 8/2011 | Fukushima et al. | 701/104 |
| 2011/0208405 A1 * | 8/2011 | Tripathi et al. | 701/102 |
| 2011/0213540 A1 * | 9/2011 | Tripathi et al. | 701/102 |
| 2012/0109495 A1 * | 5/2012 | Tripathi et al. | 701/102 |
| 2012/0130569 A1 | 5/2012 | Huntsberger et al. | |
| 2012/0191275 A1 * | 7/2012 | Clever et al. | 701/21 |

OTHER PUBLICATIONS

Web Page for PowerCharge Battery Charger HV Series—Specifications; http://www.powerdesignersusa.com/powercharge_hv_specs.htm, last visited Jan. 27, 2011 (two pages).

Brochure Page For PowerCharge Battery Charger HV Series and PowerCharge HV Series Product Matrix (two pages).

* cited by examiner

MARINE PROPULSION SYSTEM WITH EFFICIENT ENGINE SPEED DELTA

CROSS REFERENCE TO RELATED APPLICATION

This application is a continuation of U.S. patent application Ser. No. 13/588,473, filed Aug. 17, 2012, which is incorporated herein by reference in entirety.

BACKGROUND AND SUMMARY

The disclosure relates to marine propulsion systems, including engine speed control systems.

A marine engine speed control system maintains engine speed at the operator-selected engine speed. The engine has a throttle controlling engine speed according to throttle position. In response to the operator changing the operator-selected engine speed from a first-selected engine speed to a second-selected engine speed, the engine speed control system begins moving the throttle to attempt to set engine speed at the noted second-selected engine speed, and then maintain engine speed thereat.

It is common for the engine speed control system to include at least one proportional-integral-derivative (PID) controller to maintain engine speed at the operator-selected engine speed. When the operator changes the operator-selected engine speed from a first-selected engine speed to a second-selected engine speed, such change or delta causes the engine speed control system to begin moving the throttle. The amplification gain of the PID controller needs to be large enough to accommodate various deltas, including large deltas, to afford reasonably quick response time. However, large amplification gain to accommodate a large delta) causes overshoot, when attempting to set engine speed at the noted second-selected engine speed in response to the noted change of selected engine speed chosen by the operator. This can cause undesired instability or oscillation until the PID controller moves the throttle back from the overshoot position in attempting, to maintain engine speed at the noted second-selected engine speed. An alternative is to limit the amount of amplification gain of the (PID) controller to minimize overshoot, but this approach suffers from slower response time, particularly for large deltas.

The present disclosure arose during, continuing development efforts in the above technology.

DETAILED DESCRIPTION

Prior Art

Figure 1:
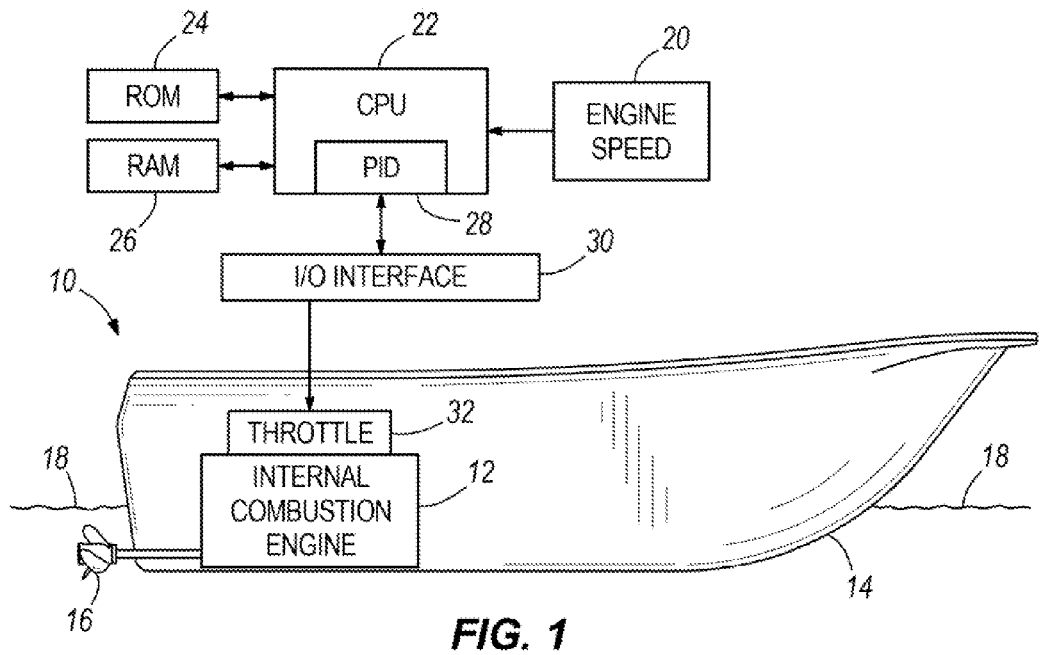
FIG. 1 is a schematic illustration of a marine propulsion system known in the prior art.

FIG. 1 shows a marine propulsion system 10 having an internal combustion engine 12 for propelling a marine vessel 14, e.g. at propeller 16, in body of water 18. Engine speed is set by the operator at an engine speed control 20, e.g. a throttle lever, or the like, as is known. A central processing unit (CPU) 22 receives the engine speed command, and includes appropriate read only memory (ROM) 24 and random access memory (RAM) 26, and typically includes a proportional integral derivative (PID) controller 28, and outputs a control signal to input-output (I/O) interface 30 which in turn supplies a control signal to internal combustion engine 12 including throttle 32, all as is known.

The engine speed control system maintains engine speed at the operator-selected engine speed. Engine 12 has the noted throttle 32 controlling engine speed according to throttle position. In response to the operator changing the operator-selected engine speed at engine speed control from a first-selected engine speed to a second-selected engine speed, i.e. a change or delta, the engine speed control system begins to move the throttle to a new position to attempt to set engine speed at the noted second-selected engine speed. The engine speed control system is subject to overshoot, particularly at large deltas, when attempting to set engine speed at the noted second-selected engine speed in response to the noted change by the operator of the selected engine speed at engine speed control 20. To accommodate various deltas, including large deltas, the PID controller 28 is provided with enough amplification gain to provide desired quick enough response time to accommodate the noted change from the first-selected engine speed to the second-selected engine speed at engine speed control 20. The higher the gain the quicker the response time however the higher gain makes the engine speed control system subject to more overshoot and instability.

Present Disclosure

Figure 2:
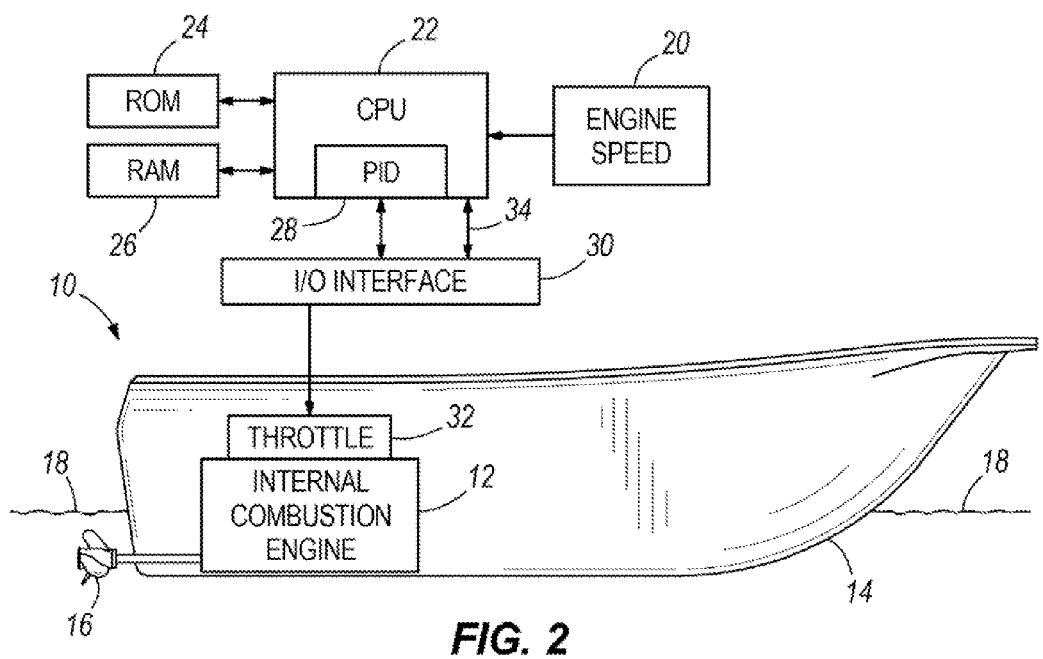
FIG. 2 is like FIG. 1 and shows the present disclosure.

In the present system, in response to the operator changing the operator-selected engine speed at engine speed control from a first-selected engine speed to a second-selected engine speed, a prediction is made as to the throttle position needed to provide the noted second-selected engine speed. A feed forward signal is then provided at 34, FIG. 2, bypassing PID controller 28, and moving throttle 32 to the predicted throttle position. After the noted movement of the throttle to the predicted throttle position, the above noted engine speed control system, including PID controller 28, maintains engine speed at the noted-selected engine speed. The throttle is moved to the predicted throttle position in response to the feed forward signal, without waiting for the engine speed control system to move the throttle. The throttle is moved to the predicted throttle position in response to the feed forward signal without the above noted overshoot otherwise caused by the engine speed control system. In one embodiment, the system enables reduction of the amplification gain of the PID controller otherwise needed to accommodate the noted change or delta from the first-selected engine speed to the second-selected engine speed at engine speed control 20, and instead accommodating such change or delta by the predicted throttle position provided by the feed forward signal 34. Accordingly, the PIE) controller amplification gain need only be large enough to maintain engine speed at the noted second-selected engine speed, without having to accommodate the change or delta from the first-selected engine speed to the second-selected engine speed. The reduced amplification gain provides enhanced stability of the (PID) controller, and reduces oscillation.

Current marine internal combustion engines are typically airflow lead, meaning that the demand from the operator requests a certain throttle percentage or throttle position. The throttle percent or position can be translated into an airflow request. For a marine propulsion system, the operator requests a particular engine speed, at engine speed control 20. By predicting the throttle percent or position needed to get to the operator requested engine speed or RPM (engine revolutions pet minute), the otherwise poor transient performance of a PID-only controller is improved. To predict the needed throttle percent or position, the airflow at a given throttle percent or position, engine speed, and engine load is predicted. The flow through a throttle is affected by engine speed, barometric pressure, and engine load. In one embodiment, in response to the operator changing the operator-selected engine speed at engine speed control 20 from a first-selected engine speed to a second-selected engine speed, throttle position is predicted as needed to provide requisite engine airflow per cylinder (APC) needed to provide the noted second-selected engine speed. In a further embodiment, a normalized APC calculation is used to predict required throttle position to achieve the noted second-selected engine speed. In one embodiment, a normalized APC calculation is used as follows:

$$(\text{normalized } APC) = K \frac{(\text{corrected } APC) - (\text{minimum } APC)}{(\text{maximum } APC) - (\text{minimum } APC)}$$

where K is a normalization function, and minimum APC and maximum APC are predetermined according to the particular marine internal combustion engine in the marine propulsion system, e.g. by an empirical data look-up table. Normalization function K can change based on barometric pressure, manifold pressure, and intake air temperature. In one embodiment, engine load is predicted at the second-selected engine speed, and the predicted engine load is convened to a predicted APC, and a corrected APC is calculated by compensating the predicted APC for a given parameter, and the normalized APC is calculated from the corrected APC. In one embodiment, where the vessel may be subject to operation at various altitudes, the corrected APC is calculated by compensating the predicted APC for different altitudes. For example, a given throttle position or percent results in different APCs at different altitudes, e.g. a throttle position at 40% open in one test provided an APC of 276 milligrams at 10,000 feet altitude, and an APC of 400 milligrams at 750 feet altitude. This variation in airflow at a given throttle position or percent due to barometric pressure, engine RPM, etc., may make the above noted correction desirable. Other parameters for correction may include differing propellers, differing vessel loads, etc. The noted normalization is desired to provide greater predictive accuracy at higher throttle settings, particularly when the pressure ratio across the throttle increases above 0.8 and approaches 1.0. Compressible flow predictions are difficult to use at pressure ratios greater than 0.8.

The present system provides a method for efficiently changing controlled engine speed of a marine internal combustion engine in a marine propulsion system for propelling a marine vessel, wherein the engine is operated at an operator-selected engine speed and an engine speed control system maintains engine speed at the operator-selected engine speed, the engine having, a throttle controlling engine speed according to throttle position, the method including responding to the operator changing the operator-selected engine speed, from a first-selected engine speed to a second-selected engine speed, by predicting throttle position needed to provide the second-selected engine speed, providing a teed forward signal moving the throttle to the predicted throttle position, after the movement of the throttle to the predicted throttle position, using the engine speed control system to maintain engine speed at the second-selected engine speed. In a further embodiment, wherein the engine speed control system moves the throttle, in response to the operator changing the operator-selected engine speed from the first-selected engine speed to the second-selected engine speed, to attempt to set engine speed at the second-selected engine speed, the method includes moving the throttle to the predicted throttle position in response to the teed forward signal, without waiting for the engine speed control system to move the throttle. In a further embodiment, wherein the engine speed control system is subject to overshoot when attempting to set engine speed at the second-selected engine speed in response to the operator changing the operator-selected engine speed from the first-selected engine speed to the second-selected engine speed, the method includes moving the throttle to the predicted throttle position in response to the feed forward signal without the overshoot otherwise caused by the engine speed control system. In a further embodiment, wherein the engine speed control system includes at least one PID controller, the method includes reducing the amplification gain, of the PID controller otherwise needed to accommodate the change from the first-selected engine speed to the second-selected engine speed, and instead accommodating the change by the predicted throttle position provided by the feed forward signal, whereby the PID controller amplification gain need only be large enough to maintain the engine speed at the second-selected engine speed, without having to accommodate the change from the first-selected engine speed to the second-selected engine speed, the reduced amplification gain providing enhanced stability of the PID controller. In a further embodiment, the method includes responding to the operator changing the operator-selected engine speed, from the first-selected engine speed to the second-selected engine speed, by predicting throttle position needed to provide requisite engine airflow per cylinder. APC, needed to provide the second-selected engine speed, using a normalized APC calculation to predict required throttle position to achieve the second-selected engine speed. In a further embodiment, the method includes using a normalized APC calculation as follows:

$$(\text{normalized } APC) = K \frac{(\text{corrected } APC) - (\text{minimum } APC)}{(\text{maximum } APC) - (\text{minimum } APC)}$$

where K is a normalization function, and minimum APC and maximum APC are predetermined according to the particular the marine internal combustion engine in the marine propulsion system. In a further embodiment, the method includes predicting engine load at the second-selected engine speed, convening the predicted engine load to a predicted APC, calculating a corrected APC by compensating the predicted APC for a given parameter, calculating the normalized APC from the corrected APC. In a further embodiment, wherein the engine speed control system moves the throttle, in response to the operator changing the operator-selected engine speed from the first-selected engine speed to the second-selected engine speed, to attempt to set engine speed at the second-selected engine speed, the method includes moving the throttle to the predicted throttle position in response to the feed forward signal, without waiting for the engine speed control system to move the throttle, wherein the engine speed control system includes at least one PID controller, and the method includes reducing the amplification gain of the PID controller otherwise needed to accommodate the change from the first-selected engine speed to the second-selected engine speed, and instead accommodating the change by the predicted throttle position provided by the feed forward signal, whereby the PID controller amplification vain need only be large enough to maintain the engine speed at the second-selected engine speed, without having to accommodate the change from the first-selected engine speed to the second-selected engine speed, the reduced amplification gain providing enhanced stability of the PID controller, responding to the operator changing the operator-selected engine speed, from the first-selected engine speed to the second-selected engine speed, by predicting throttle position needed to provide requisite engine airflow per cylinder, APC, needed to provide the second-selected engine speed, using a normalized APC calculation to predict required throttle position to achieve the second-selected engine speed, predicting engine load at the second-selected engine speed, converting, the predicted engine load to a predicted APC, calculating a corrected APC by compensating the predicted APC for barometric pressure (eg for altitude compensation), and calculating the normalized APC from the corrected APC.

The disclosure provides a system for efficiently changing controlled engine speed of a marine internal combustion engine in a marine propulsion system for propelling a marine vessel, the engine being, operated at an operator selected engine speed and an engine speed control system maintaining engine speed at the operator-selected engine speed, the engine having a throttle controlling engine speed according to throttle position, the system including a control circuit having a processor, a memory, and an input/output interface, wherein the control circuit responds to the operator changing the operator-selected engine speed, from a first-selected engine speed to a second-selected engine speed, by predicting throttle position needed to provide the second-selected engine speed, and provides a feed forward signal moving the throttle to the predicted throttle position, and after the movement of the throttle to the predicted throttle position, uses the engine speed control system to maintain engine speed at the second-selected engine speed. The control circuit including at CPU 22, ROM 24, RAM 26, includes a computer-readable medium having computer-executable instructions for performing the above noted method, including the steps set forth above.

In further embodiments, the disclosure is applicable to hybrid marine propulsion systems having both an internal combustion engine and an electric propulsion system, including an electric motor, for propelling a marine vessel. The system and method of the present disclosure is used for efficiently changing controlled engine speed of the marine internal combustion engine in the hybrid marine propulsion system.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

What is claimed is:

1. A method for changing controlled engine speed of a marine internal combustion engine in a marine propulsion system for propelling a marine vessel, wherein said engine is operated at an operator-selected engine speed and an engine speed control system maintains engine speed at said operator-selected engine speed, said engine having a throttle controlling engine speed according to throttle position, said method comprising:
   responding to an operator changing said operator-selected engine speed, from a first-selected engine speed to a second-selected engine speed, by predicting throttle position needed to provide said second-selected engine speed;
   providing a feed forward signal moving said throttle to said predicted throttle position;
   moving said throttle, in response to said operator changing said operator-selected engine speed from said first-selected engine speed to said second-selected engine speed, to attempt to set engine speed at said second-selected engine speed; and
   after moving said throttle to said predicted throttle position, using said engine speed control system to maintain engine speed at said second-selected engine speed.

2. The method according to claim 1 further comprising:
   moving said throttle to said predicted throttle position in response to said feed forward signal, without waiting for said engine speed control system to move said throttle.

3. The method according to claim 2 wherein said engine speed control system is subject to overshoot when attempting to set engine speed at said second-selected engine speed in response to said operator changing said operator-selected engine speed from said first-selected engine speed to said second-selected engine speed, and comprising:
   moving said throttle to said predicted throttle position in response to said feed forward signal without said overshoot otherwise caused by said engine speed control system.

4. The method according to claim 2 wherein said engine speed control system includes at least one PID controller, and comprising:
   reducing an amplification gain of said PID controller otherwise needed to accommodate said change from said first-selected engine speed to said second-selected engine speed, and instead accommodating said change by said predicted throttle position provided by said feed forward signal, whereby said PID controller amplification gain need only be large enough to maintain said engine speed at said second-selected engine speed, without having to accommodate said change from said first-selected engine speed to said second-selected engine speed, said reduced amplification gain providing enhanced stability of said PID controller.

5. The method according to claim 1 comprising:
   responding to said operator changing said operator-selected engine speed, from said first-selected engine speed to said second-selected engine speed, by predicting throttle position needed to provide requisite engine airflow per cylinder, APC, needed to provide said second-selected engine speed;
   using a normalized APC calculation to predict required throttle position to achieve said second-selected engine speed.

6. The method according to claim 5 comprising using a normalized APC calculation as follows:

$$\text{(normalized } APC\text{)} = K \frac{\text{(corrected } APC\text{)} - \text{(minimum } APC\text{)}}{\text{(maximum } APC\text{)} - \text{(minimum } APC\text{)}}$$

where K is a normalization function, and minimum APC and maximum APC are predetermined according to the particular said marine internal combustion engine in said marine propulsion system.

7. The method according to claim 5 comprising:
predicting an engine load at said second-selected engine speed;
converting said predicted engine load to a predicted APC;
calculating a corrected APC by compensating said predicted APC for a given parameter; and
calculating a normalized APC from said corrected APC.

8. The method according to claim 1 further comprising:
moving said throttle to said predicted throttle position in response to said feed forward signal, without waiting for said engine speed control system to move said throttle;
wherein said engine speed control system includes at least one PID controller, and comprising:
reducing an amplification gain of said PID controller otherwise needed to accommodate said change from said first-selected engine speed to said second-selected engine speed, and instead accommodating said change by said predicted throttle position provided by said feed forward signal, whereby said PID controller amplification gain need only be large enough to maintain said engine speed at said second-selected engine speed, without having to accommodate said change from said first-selected engine speed to said second-selected engine speed, said reduced amplification gain providing enhanced stability of said PID controller;
responding to said operator changing said operator-selected engine speed, from said first-selected engine speed to said second-selected engine speed, by predicting throttle position needed to provide requisite engine airflow per cylinder, APC, needed to provide said second-selected engine speed;
using a normalized APC calculation to predict required throttle position to achieve said second-selected engine speed;
predicting an engine load at said second-selected engine speed;
converting said predicted engine load to a predicted APC;
calculating a corrected APC by compensating said predicted APC for barometric pressure; and
calculating a normalized APC from said corrected APC.

9. A marine propulsion system with efficient changing of controlled engine speed of a marine internal combustion engine in a marine propulsion system for propelling a marine vessel, wherein said engine is operated at an operator-selected engine speed and an engine speed control system maintains engine speed at said operator-selected engine speed, said engine having a throttle controlling engine speed according to throttle position,
said marine propulsion system with efficient changing of controlled engine speed comprising a control circuit having a processor, a memory, and an input/output interface, wherein the control circuit:
responds to said an operator changing said operator-selected engine speed, from a first-selected engine speed to a second-selected engine speed, by predicting throttle position needed to provide said second-selected engine speed;
provides a feed forward signal moving said throttle to said predicted throttle position;
moves said throttle, in response to said operator changing said operator-selected engine speed from said first-selected engine speed to said second-selected engine speed, to attempt to set engine speed at said second-selected engine speed; and
after said movement of said throttle to said predicted throttle position, uses said engine speed control system to maintain engine speed at said second-selected engine speed.

10. The marine propulsion system according to claim 9 wherein said control circuit moves said throttle to said predicted throttle position in response to said feed forward signal, without waiting for said engine speed control system to more said throttle.

11. The marine propulsion system according to claim 10 wherein said engine speed control system is subject to overshoot when attempting to set engine speed at said second-selected engine speed in response to said operator changing said operator-selected engine speed from said first-selected engine speed to said second-selected engine speed, wherein said control circuit moves said throttle to said predicted throttle position in response to said feed forward signal without said overshoot otherwise caused by said engine speed control system.

12. The marine propulsion system according to claim 10 wherein said engine speed control system includes at least one PID controller, wherein said control circuit reduces an amplification gain of said PID controller otherwise needed to accommodate said change from said first-selected engine speed to said second-selected engine speed, and instead accommodates said change by said predicted throttle position provided by said feed forward signal, whereby said PID controller amplification gain need only be large enough to maintain said engine speed at said second-selected engine speed, without having to accommodate said change from said first-selected engine speed to said second-selected engine speed, said reduced amplification gain providing enhanced stability of said PID controller.

13. The marine propulsion system according to claim 9 wherein said control circuit:
responds to said operator changing said operator-selected engine speed, from said first-selected engine speed to said second-selected engine speed, by predicting throttle position needed to provide requisite engine airflow per cylinder, APC, needed to provide said second-selected engine speed;
uses a normalized APC calculation to predict required throttle position to achieve said second-selected engine speed.

14. The marine propulsion system according to claim 13 wherein said control circuit uses a normalized APC calculation as follows:

$$(\text{normalized } APC) = K \frac{(\text{corrected } APC) - (\text{minimum } APC)}{(\text{maximum } APC) - (\text{minimum } APC)}$$

where K is a normalization function, and minimum APC and maximum APC are predetermined according to the particular said marine internal combustion engine in said marine propulsion system.

15. The marine propulsion system according to claim 13 wherein said control circuit:
predicts an engine load at said second-selected engine speed;
converts said predicted engine load to a predicted APC;
calculates a corrected APC by compensating said predicted APC for a given parameter; and
calculates a normalized APC from said corrected APC.

16. The marine propulsion system according to claim 9 wherein said engine speed control system includes at least one PID controller, and wherein said control circuit:
- moves said throttle to said predicted throttle position in response to said feed forward signal, without waiting for said engine speed control system to move said throttle;
- reduces an amplification gain of said PID controller otherwise needed to accommodate said change from said first-selected engine speed to said second-selected engine speed, and instead accommodates said change by said predicted throttle position provided by said feed forward signal, whereby said PID controller amplification gain need only be large enough to maintain said engine speed at said second-selected engine speed, without having to accommodate said change from said first-selected engine speed to said second-selected engine speed, said reduced amplification gain providing enhanced stability of said PID controller;
- responds to said operator changing said operator-selected engine speed, from said first-selected engine speed to said second-selected engine speed, by predicting throttle position needed to provide requisite engine airflow per cylinder, APC, needed to provide said second-selected engine speed;
- uses a normalized APC calculation to predict required throttle position to achieve said second-selected engine speed;
- predicts an engine load at said second-selected engine speed;
- converts said predicted engine load to a predicted APC;
- calculates a corrected APC by compensating said predicted APC for barometric pressure; and
- calculates a normalized APC from said corrected APC.

17. A non-transitory computer-readable medium having computer-executable instructions for performing a method for changing controlled engine speed of a marine internal combustion engine in a marine propulsion system for propelling a marine vessel, wherein said engine is operated at an operator-selected engine speed and an engine speed control system maintains engine speed at said operator-selected engine speed, said engine having a throttle controlling engine speed according to throttle position,
said method comprising:
- responding to an operator changing said operator-selected engine speed, from a first-selected engine speed to a second-selected engine speed, by predicting throttle position needed to provide said second-selected engine speed;
- providing a feed forward signal moving said throttle to said predicted throttle position;
- moving said throttle, in response to said operator changing said operator-selected engine speed from said first-selected engine speed to said second-selected engine speed, to attempt to set engine speed at said second-selected engine speed; and
- after moving said throttle to said predicted throttle position, using said engine speed control system to maintain engine speed at said second-selected engine speed.

18. The non-transitory computer-readable medium having computer-executable instructions according to claim 17 wherein said method comprises:
- moving said throttle to said predicted throttle position in response to said feed forward signal, without waiting for said engine speed control system to move said throttle;
- wherein said engine speed control system includes at least one PID controller, and comprising:
- reducing an amplification gain of said PID controller otherwise needed to accommodate said change from said first-selected engine speed to said second-selected engine speed, and instead accommodating said change by said predicted throttle position provided by said feed forward signal, whereby said PID controller amplification gain need only be large enough to maintain said engine speed at said second-selected engine speed, without having to accommodate said change from said first-selected engine speed to said second-selected engine speed, said reduced amplification gain providing enhanced stability of said PID controller;
- responding to said operator changing said operator-selected engine speed, from said first-selected engine speed to said second-selected engine speed, by predicting throttle position needed to provide requisite engine airflow per cylinder, APC, needed to provide said second-selected engine speed;
- using a normalized APC calculation to predict required throttle position to achieve said second-selected engine speed;
- predicting an engine load at said second-selected engine speed;
- converting said predicted engine load to a predicted APC;
- calculating a corrected APC by compensating said predicted APC for barometric pressure; and
- calculating a normalized APC from said corrected APC.

* * * * *

UNITED STATES PATENT AND TRADEMARK OFFICE
CERTIFICATE OF CORRECTION

PATENT NO.         : 9,156,536 B1
APPLICATION NO.    : 14/284795
DATED              : October 13, 2015
INVENTOR(S)        : Jason S. Arbuckle, Matthew W. Snyder and Thomas S. Kirchhoff Page 1 of 1

It is certified that error appears in the above-identified patent and that said Letters Patent is hereby corrected as shown below:

In claim 9, at column 7, line 56, the phrase "to said an operator" should be changed to --to an operator--

In claim 10, at column 8, line 9, the word "more" should be changed to --move--

Signed and Sealed this
Twenty-eighth Day of June, 2016

Michelle K. Lee
*Director of the United States Patent and Trademark Office*